US012689895B2

(12) United States Patent
Zavesky et al.

(10) Patent No.: US 12,689,895 B2
(45) Date of Patent: Jul. 21, 2026

(54) DROP-IN PROBE THAT FACILITATES MANAGEMENT AND CONFIGURATION OF INTERNET OF THINGS NETWORK CONNECTED DEVICES

(71) Applicant: AT&T Intellectual Property I, L.P., Atlanta, GA (US)

(72) Inventors: Eric Zavesky, Austin, TX (US); Bernard S. Renger, New Providence, NJ (US); Behzad Shahraray, Holmdel, NJ (US); David Crawford Gibbon, Lincroft, NJ (US); Lee Begeja, Gillette, NJ (US); Timothy Innes, Atlanta, GA (US)

(73) Assignee: AT&T Intellecutal Property I, L.P., Atlanta, GA (US)

( * ) Notice: Subject to any disclaimer, the term of this patent is extended or adjusted under 35 U.S.C. 154(b) by 18 days.

(21) Appl. No.: 18/298,768

(22) Filed: Apr. 11, 2023

(65) Prior Publication Data

US 2023/0247425 A1 Aug. 3, 2023

Related U.S. Application Data

(63) Continuation of application No. 17/358,403, filed on Jun. 25, 2021, now Pat. No. 11,653,201, which is a
(Continued)

(51) Int. Cl.
G06F 3/0484 (2022.01)
H04L 9/40 (2022.01)
(Continued)

(52) U.S. Cl.
CPC ............. *H04W 12/06* (2013.01); *H04L 63/00* (2013.01); *H04L 67/125* (2013.01); *H04L 67/34* (2013.01);
(Continued)

(58) Field of Classification Search
CPC .......... H04L 67/12; H04L 12/66; H04W 4/70; H04W 4/50; H04W 4/80
See application file for complete search history.

(56) References Cited

U.S. PATENT DOCUMENTS

| | | | |
|---|---|---|---|
| 7,583,604 | B2 | 9/2009 | Couturier |
| 8,539,582 | B1 | 9/2013 | Aziz et al. |

(Continued)

OTHER PUBLICATIONS

Millar, Stuart, "Network Security Issues in The Internet of Things (IoT)." Queen's University Belfast (2016) 7 pages.
(Continued)

*Primary Examiner* — Nicholas R Taylor
*Assistant Examiner* — Ho T Shiu

(57) ABSTRACT

Management and configuration of internet of things network connected devices is facilitated herein. A probe device comprises a memory that stores executable instructions that, when executed by a processor, facilitate performance of operations that comprise determining a first identity and a first operational parameter of a first device and a second identity and a second operational parameter of a second device. The first device and the second device can be associated with a defined communication network. The probe device can be provisioned within the defined communication network and can operate as a security update probe node for the first device and the second device. The operations can also comprise facilitating a first security update at the first device and a second security update at the second device based on a determination that the first device and the second device have delegated responsibility for security synchronization to the probe device.

20 Claims, 10 Drawing Sheets

Related U.S. Application Data continuation of application No. 15/862,917, filed on Jan. 5, 2018, now Pat. No. 11,082,837.

(51) Int. Cl.

| | |
|---|---|
| *H04L 67/00* | (2022.01) |
| *H04L 67/125* | (2022.01) |
| *H04L 67/56* | (2022.01) |
| *H04W 4/70* | (2018.01) |
| *H04W 12/06* | (2021.01) |
| *H04W 12/08* | (2021.01) |
| *H04W 56/00* | (2009.01) |
| *G06N 20/00* | (2019.01) |
| *H04W 8/00* | (2009.01) |

(52) U.S. Cl.

CPC .............. *H04L 67/56* (2022.05); *H04W 4/70* (2018.02); *H04W 12/08* (2013.01); *H04W 56/001* (2013.01); *G06N 20/00* (2019.01); *H04W 8/005* (2013.01)

(56) References Cited

U.S. PATENT DOCUMENTS

| | | | |
|---|---|---|---|
| 8,990,891 B1 | 3/2015 | Chickering et al. | |
| 9,479,485 B2 | 10/2016 | Chen | |
| 9,654,361 B2 | 5/2017 | Vasseur et al. | |
| 10,291,477 B1* | 5/2019 | Askar | H04L 67/12 |
| 2007/0030539 A1* | 2/2007 | Nath | H04W 12/08 |
| | | | 358/520 |
| 2009/0054033 A1 | 2/2009 | Pratt, Jr. et al. | |
| 2011/0149928 A1* | 6/2011 | Wu | H04W 84/12 |
| | | | 370/338 |
| 2014/0157351 A1 | 6/2014 | Canning et al. | |
| 2015/0106490 A1* | 4/2015 | Floyd, III | H04L 41/0659 |
| | | | 709/223 |
| 2015/0249672 A1 | 9/2015 | Burns et al. | |
| 2016/0007288 A1* | 1/2016 | Samardzija | H04W 52/0229 |
| | | | 370/311 |
| 2016/0014149 A1 | 1/2016 | Bradley et al. | |
| 2016/0028645 A1 | 1/2016 | Hohn et al. | |
| 2016/0112374 A1 | 4/2016 | Branca | |
| 2016/0234628 A1 | 8/2016 | Rahman et al. | |
| 2016/0234689 A1 | 8/2016 | Stan et al. | |
| 2016/0371074 A1* | 12/2016 | Vyas | H04W 4/60 |
| 2017/0005820 A1 | 1/2017 | Zimmerman et al. | |
| 2017/0041298 A1* | 2/2017 | Lehnhardt | G06F 16/23 |
| 2017/0063940 A1 | 3/2017 | Lapidous et al. | |
| 2017/0155680 A1 | 6/2017 | Wackerly | |
| 2017/0163671 A1 | 6/2017 | Pendse | |
| 2017/0195294 A1 | 7/2017 | Branca | |
| 2017/0214701 A1 | 7/2017 | Hasan | |
| 2017/0230832 A1 | 8/2017 | Ophir et al. | |
| 2017/0237763 A1 | 8/2017 | Candelore | |
| 2017/0295081 A1 | 10/2017 | Mermoud et al. | |
| 2017/0332232 A1 | 11/2017 | Weinberg et al. | |
| 2017/0353462 A1 | 12/2017 | Siwal et al. | |
| 2018/0048987 A1* | 2/2018 | Morris | H04B 5/0031 |
| 2018/0191814 A1 | 7/2018 | Kinarti et al. | |
| 2018/0359696 A1 | 12/2018 | Borean et al. | |
| 2019/0045412 A1* | 2/2019 | Shivam | H04W 40/02 |
| 2019/0150134 A1* | 5/2019 | Kakinada | H04W 16/14 |
| | | | 370/330 |

OTHER PUBLICATIONS

Non-Final Office Action received for U.S. Appl. No. 15/862,917 dated Feb. 6, 2020, 31 pages.

Final Office Action received for U.S. Appl. No. 15/862,917 dated Aug. 7, 2020, 31 pages.

Non-Final Office Action received for U.S. Appl. No. 15/862,917 dated Dec. 10, 2020, 45 pages.

Non-Final Office Action received for U.S. Appl. No. 17/358,403 dated Jun. 24, 2022, 27 pages.

Notice of Allowance received for U.S. Appl. No. 17/358,403 dated Jan. 12, 2023, 26 pages.

* cited by examiner

200

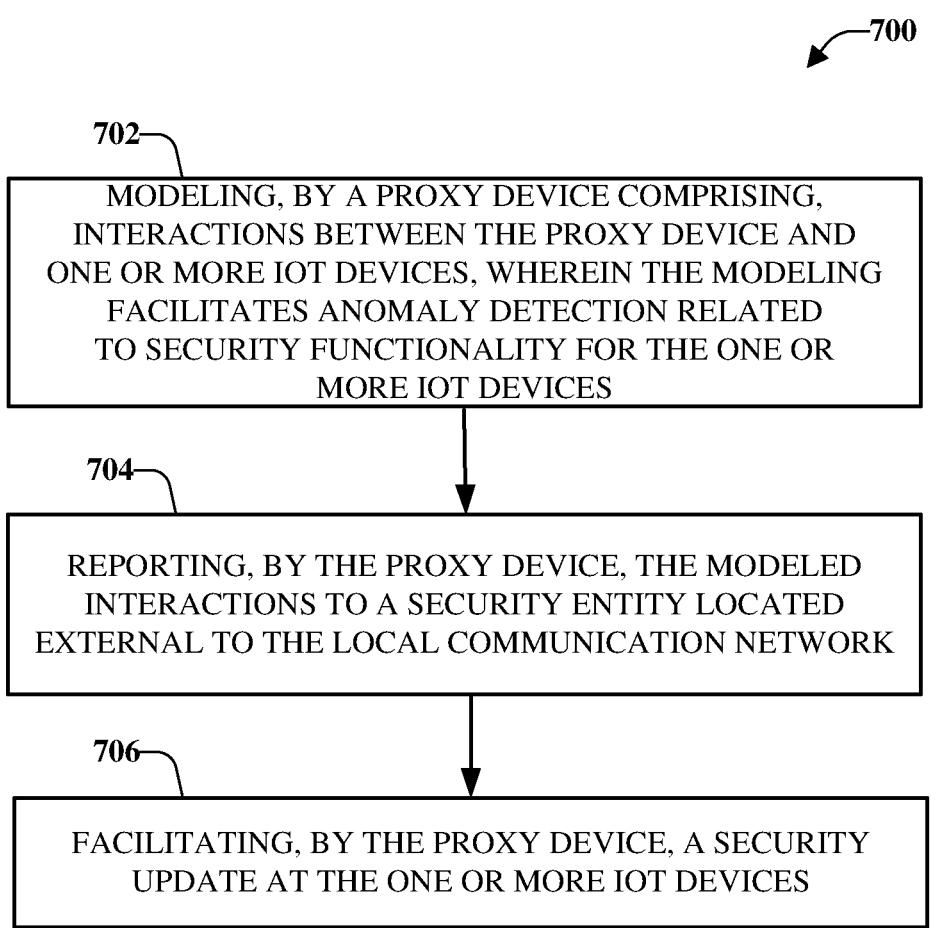

700

702

MODELING, BY A PROXY DEVICE COMPRISING,
INTERACTIONS BETWEEN THE PROXY DEVICE AND
ONE OR MORE IOT DEVICES, WHEREIN THE MODELING
FACILITATES ANOMALY DETECTION RELATED
TO SECURITY FUNCTIONALITY FOR THE ONE OR
MORE IOT DEVICES

704

REPORTING, BY THE PROXY DEVICE, THE MODELED
INTERACTIONS TO A SECURITY ENTITY LOCATED
EXTERNAL TO THE LOCAL COMMUNICATION NETWORK

706

FACILITATING, BY THE PROXY DEVICE, A SECURITY
UPDATE AT THE ONE OR MORE IOT DEVICES

FIG. 7

DROP-IN PROBE THAT FACILITATES MANAGEMENT AND CONFIGURATION OF INTERNET OF THINGS NETWORK CONNECTED DEVICES

RELATED APPLICATIONS

The subject patent application is a continuation of, and claims priority to each of, U.S. patent application Ser. No. 17/358,403, filed Jun. 25, 2021, and entitled "A DROP-IN PROBE THAT FACILITATES MANAGEMENT AND CONFIGURATION OF INTERNET OF THINGS NET-WORK CONNECTED DEVICES," which is a continuation of U.S. patent application Ser. No. 15/862,917 (now U.S. Pat. No. 11,082,837), filed Jan. 5, 2018, and entitled "A DROP-IN PROBE THAT FACILITATES MANAGEMENT AND CONFIGURATION OF INTERNET OF THINGS NETWORK CONNECTED DEVICES," the entireties of which priority applications are hereby expressly incorporated by reference herein.

TECHNICAL FIELD

The subject disclosure relates generally to communications systems and internet of things network connected devices, and for example, to a drop-in probe that facilitates management and configuration of internet of things network connected devices.

BACKGROUND

The advancement of computing technologies has evolved into an inter-networking of an "Internet of Things" (IoTs) devices with the capability to collect and exchange data. Devices that can be utilized as IoT devices include physical devices, appliances, vehicles, objects, and other items embedded with communication capabilities. The utilization of IoT devices can be insecure as it relates to security and the integrity of the network. Further, the lack of synchronization of software updates for low-power devices that are on, but are inactive, can cause further network issues. Therefore, the security and management of the IoT devices present unique challenges.

BRIEF DESCRIPTION OF THE DRAWINGS

Various non-limiting embodiments are further described with reference to the accompanying drawings in which:

FIG. 7 illustrates an example, non-limiting, method for modeling and reporting parameters associated with internet of things network connected devices in accordance with one or more embodiments described herein;

DETAILED DESCRIPTION

Figure 1:
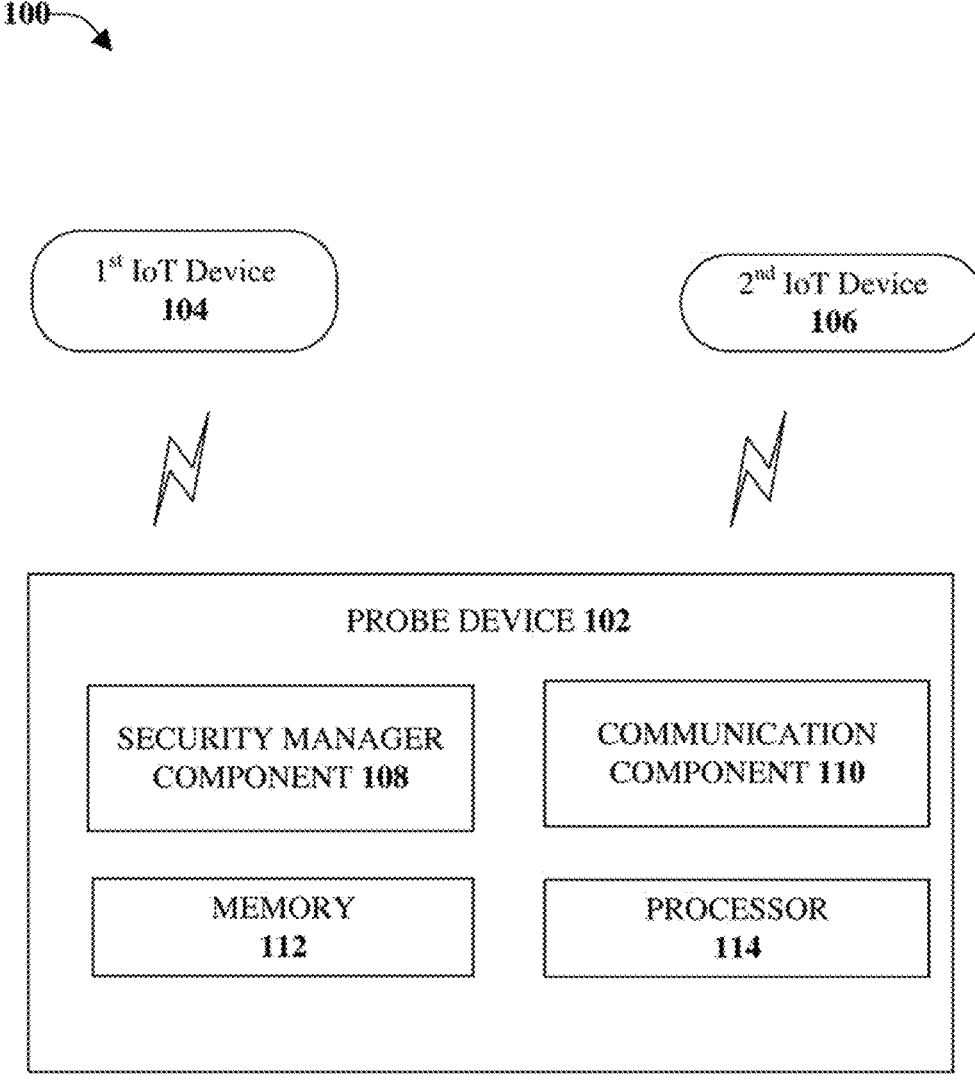
FIG. 1 illustrates an example, non-limiting, communication network in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate security related functions for a network of internet of things (IoT) devices. According to an implementation, the various aspects can be embodied in a probe device that can be implemented in hardware (e.g., as a stand-alone device, which can take over an unused device) or in software (e.g., as a component of another device). For example, the probe device can be installed as software on a gateway device, a computer, or another device.

The probe device can perform and operate as a probe device for the IoT devices. According to some implementations, the probe device can isolate one or more of the IoT devices based on detection of a security vulnerability at the one or more IoT devices. For example, the security vulnerability can be malware installed on an IoT device. In another example, the security vulnerability can be an unsecure device entering the network.

In additional or alternative implementations, reporting related to the security vulnerability and/or other security parameters of the IoT devices can be communicated to a security vendor, for example. It is noted that the term "IoT device" is utilized herein and refers to an IoT network connected device, regardless of the communication protocol the IoT device is using for connectivity (e.g., Wi-Fi, Bluetooth, ZigBee, and so on). As such, various IoT devices that utilize the same, similar, or different communication protocols can be utilized with the disclosed aspects.

IoT devices are known to be insecure devices that can be "hacked" or accessed by unauthorized users and/or rogue entities. A network of IoT devices across a technology stack (e.g., a set of software that provides the infrastructure for a computing device) can also be flawed and have security concerns. However, seldom is there an administrative counterpart for the technology stack that can verify security and patch requirements. While automation can assist to maintain IoT devices in better synchronization with the latest (or most up-to-date) software releases, most environments still lack the network and device security for a complete solution. Additionally, newer low-power devices that are on but inactive (e.g., sleeping, operations are inhibited) can create additional problems with correctly synchronizing software update efforts.

In one embodiment, described herein is a probe device that can comprise a processor and a memory that stores executable instructions that, when executed by the processor, facilitate performance of operations. The operations can comprise determining a first identity and a first operational parameter of a first device and a second identity and a second operational parameter of a second device. The first device and the second device can be associated with a defined communication network. Further, the probe device can be provisioned within the defined communication network and can operate as a security update probe node for the first device and the second device. The operations can also comprise facilitating a first security update at the first device and a second security update at the second device based on a determination that the first device and the second device have delegated responsibility for security synchronization to the probe device.

According to an implementation, the operations can comprise determining that a security vulnerability has manifested at the first device. Further to these implementations, the operations can comprise isolating the first device from the security vulnerability. Isolating the first device can comprise simulating operation of the first device with respect to features associated with the security vulnerability. In an example, isolating the first device from the security vulnerability can comprise intercepting malicious instructions associated with malicious actions intended for the first device. Intercepting the malicious instructions can comprise routing the malicious instructions associated with the malicious actions to the probe device.

In an example, facilitating the first security update and the second security update can comprise pooling security patch versions for the first device and the second device. Further, a first group of security features can be updated at the first device and a second group of security features can be updated at the second device based on the security patch versions.

In some implementations, the operations can comprise reporting a state of the defined communication network to a security network entity. The state of the defined communication network can comprise security log filtering based on respective capacity parameters of the first device and the second device.

In an example, communications between the probe device and external devices located outside the defined communication network can be disabled (e.g., the probe device cannot access the Internet). Further to this example, the operations can comprise facilitating an establishment of a communication link between the probe device and a mobile device determined to be located within the defined communication network. The probe device can communicate with the external devices based on the communication link between the probe device and the mobile device. In addition, the operations can comprise discontinuing communication with the external devices based on the mobile device determined to have been removed from the defined communication network.

In some implementations, the probe device can be implemented as a component of a mobile device that is associated with the defined communication network. In other implementations, the probe device can be implemented as a stand-alone physical device provisioned within the defined communication network.

According to some implementations, the operations can comprise detecting a new device within an environment of the defined communication network. Further to these implementations, the operations can comprise quarantining the new device based on a determination that an agreement has not been established between the new device and the defined communication network. Quarantining the new device can comprise routing network traffic with the new device via the probe device.

In an example, the first device can be in an inactive mode in which operations of the first device are inhibited. In another example, the first device and the second device can be classified as internet of things network connected devices.

Another embodiment provided herein relates to a method that can comprise initializing a probe device within a local communication network. The probe device can comprise a processor and can provide security update synchronization for devices of the local communication network. The method can also comprise determining, by the probe device, operational parameters of the devices. The operational parameters can comprise a security parameter. Further, the method can comprise determining, by the probe device, security updates are available for a group of the devices based on the operational parameters. In addition, the method can comprise facilitating, by the probe device, implementing respective security updates at the group of the devices. The respective security updates can be implemented without interaction received from the group of the devices.

In some implementations, the method can comprise modeling, by the probe device, interactions between the probe device and the devices resulting in modeled interactions. Modeling the interactions can facilitate anomaly detection related to security functionality for the devices. Further to these implementations, the method can comprise reporting, by the probe device, the modeled interactions to a security entity located external to the local communication network.

In an additional or alternative implementation, the method can comprise determining, by the probe device, a security vulnerability exists at a device of the devices. According to these implementations, the method can also comprise isolating, by the probe device, the device from the security vulnerability. In an example, isolating the device can comprise mimicking, by the probe device, an operation of the device for functionalities associated with the security vulnerability. In another example, isolating the device can comprise intercepting network traffic associated with malicious actions intended for the device. The network traffic associated with the malicious actions can be routed to the probe device.

Still another embodiment provided herein relates to a machine-readable storage medium, comprising executable instructions that, when executed by a processor of a probe node, facilitate performance of operations. The operations can comprise determining a first identity and a first operational parameter of a first device of the group of devices, and a second identity and a second operational parameter of a second device of the group of devices. The operations can also comprise facilitating a first security update at the first device and a second security update at the second device based on a determination that the probe node has been granted security responsibility for the first device and the second device.

In an implementation, the determination can be a first determination and the operations can further comprise emulating functionality of the first device based on a second determination that a security vulnerability exists on the first device. Further, the operations can comprise identifying a source of the security vulnerability based on the emulating.

In some implementations, the method can comprise reporting, to a third device associated with a security service provider, an identification of the source and details of the security vulnerability. In response to the reporting, the operations can comprise updating a security feature of the first device based on a security update received from the third device associated with the security service.

FIG. 1 illustrates an example, non-limiting, communication network 100 in accordance with one or more embodiments described herein. As illustrated, the communication network 100 can include a probe device 102 (sometimes referred to as a probe device or a probe node). The probe device 102 can be configured to be inserted into a network (e.g., a home network, an office network, and so on). For example, the probe device 102 can be purchased as a piece of hardware (e.g., a stand-alone device) that can be provisioned within the communication network 100, such as through a user device (e.g., a cell phone or other device). In another example, the probe device 102 can represent a software module that can be installed on an existing device within the environment (e.g., a cell phone, a laptop, an unused device).

Also included in the communication network 100 can be a multitude of IoT devices that can be connected to a common communication network. In some environments, there can be a small number of IoT devices (e.g., less than ten). However, in other environments, there can be hundreds, or even thousands, of IoT devices. The probe device 102 can be configured to explore the communication network 100 and its local physical space. The probe device 102 can be configured to provide security synchronization and security updates to the IoT devices regardless of the number of devices. For purposes of explaining the disclosed aspects, two IoT devices, namely, a first IoT device 104 and a second IoT device 106 are illustrated and described.

According to an implementation, the wireless network can be a local area network (LAN). It is to be understood that although various aspects are discussed with respect to a local area network, the disclosed aspects are not limited to these implementations. Instead, one or more embodiments are capable of being implemented in conjunction with any other type of computing environment now known or later developed.

As illustrated, the probe device 102 can comprise a security manager component 108, a communication component 110, at least one memory 112, and at least one processor 114. The probe device 102 can be deployed as a nearly complete security stack on a small device that can maintain network connectivity while inspecting all devices (e.g., the first IoT device 104, the second IoT device 106) on the network. For example, the security manager component 108 can be delegated responsibility for security updates and synchronization for the IoT devices (e.g., the first IoT device 104 and the second IoT device 106). For example, at about the same time as the probe device 102 is provisioned within the communication network 100, or at a different time (e.g., based on discovery of a new IoT device in the network, based on a request from an IoT device, and so on), the probe device 102 can take over security management. The request can be received by the communication component 110. Thus, the probe device 102 can be a central trusted source.

Further, the security manager component 108 can concurrently probe the IoT devices on the local network (e.g., a home, hospital, small business, and so on) to perform security management as discussed herein.

According to an implementation, the security manager component 108 can provide nearly instantaneous updates of security patches and exploits. Exploits are pieces of software, a sequence of commands, or a chunk of data that takes advantage of a vulnerability to cause a behavior (usually unintended or unanticipated) to occur on the IoT device (e.g., a security concern). In an example, the security manager component 108 can pool patch versions and/or exploit probe codes.

In some implementations, the security manager component 108 can probe a network of proximal devices via the communication component 110. In an example, the probe device 102 can perform advanced honeypot emulation (including low-power IoT devices). Honeypot emulation (or simply "honeypot") is a computing security mechanism that can detect, deflect, and/or counteract attempts at unauthorized use of a device (e.g., the IoT devices). A honeypot comprises data that appears to be from another part of a network (e.g., an IoT device), but is isolated and monitored and, therefore, can protect or quarantine the IoT device from the security vulnerability. As discussed herein, the probe device 102, can perform the honeypot emulation without redundant servers or power hungry and aggressive security software.

Further, advanced honeypot emulations can be performed, even on small networks. For example, the probe device 102 can act as the proverbial "canary in the mine" for early detection of malicious software and hacking attempts.

In another implementation, the communication component 110 can perform advanced reporting of an IoT state of the communication network 100. For example, the reporting can be transmitted to responsible entities (e.g., a user, a network administrator, a security vendor, and so on). Further, intelligent log filtering can be performed based on capacity demands and priority. In some implementations, interactions between the IoT devices and the probe device 102 can be learned or modeled and the learned interactions (or modeled interactions) can be evaluated for anomaly detection as it relates to security issues.

For example, the communication component 110 can provide full reporting to local network administrators, service providers, or other responsible entities for advanced network health statistics. Further, low-delay updates for security patches and fast scanning for newly discovered exploits within a network can be performed with no additional administrative effort.

In some cases, discovery of low-power IoT, which can be in an inactive or sleeping mode and, therefore, hard to inspect, can be performed according to the various aspects disclosed herein. Further, the low-power IoT devices can be updated without exact knowledge of location and connectivity parameters.

Further, the probe device 102 can operate as a firewall-in-a-box. For example, the firewall provided by the probe device 102 can go beyond traditional gateway and router configurations by tuning for specific exploitive network traffic patterns and destination hosts.

The at least one memory 112 can be operatively coupled to the at least one processor 114. The at least one memory 112 can store protocols associated with facilitating management and configuration of internet of things network connected devices as discussed herein. Further, the at least one memory 112 can facilitate action to control communication between the probe device 102, the first IoT device 104, the second IoT device 106, other devices, and so on, such that the probe device 102 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 114 can facilitate security synchronization and management in a communication network to update one or more IoT devices with security features, apply one or more security patches to the IoT devices, monitor a health or security vulnerability of the IoT devices, and so on, as discussed herein. The at least one processor 114 can be a processor dedicated to analyzing security concerns at one or more IoT devices, mimicking behavior of an IoT device to isolate a security vulnerability, and/or generation of reports. In some implementations, the at least one processor 114 can control one or more components of the communications system (e.g., the communication network 100).

Figure 2:
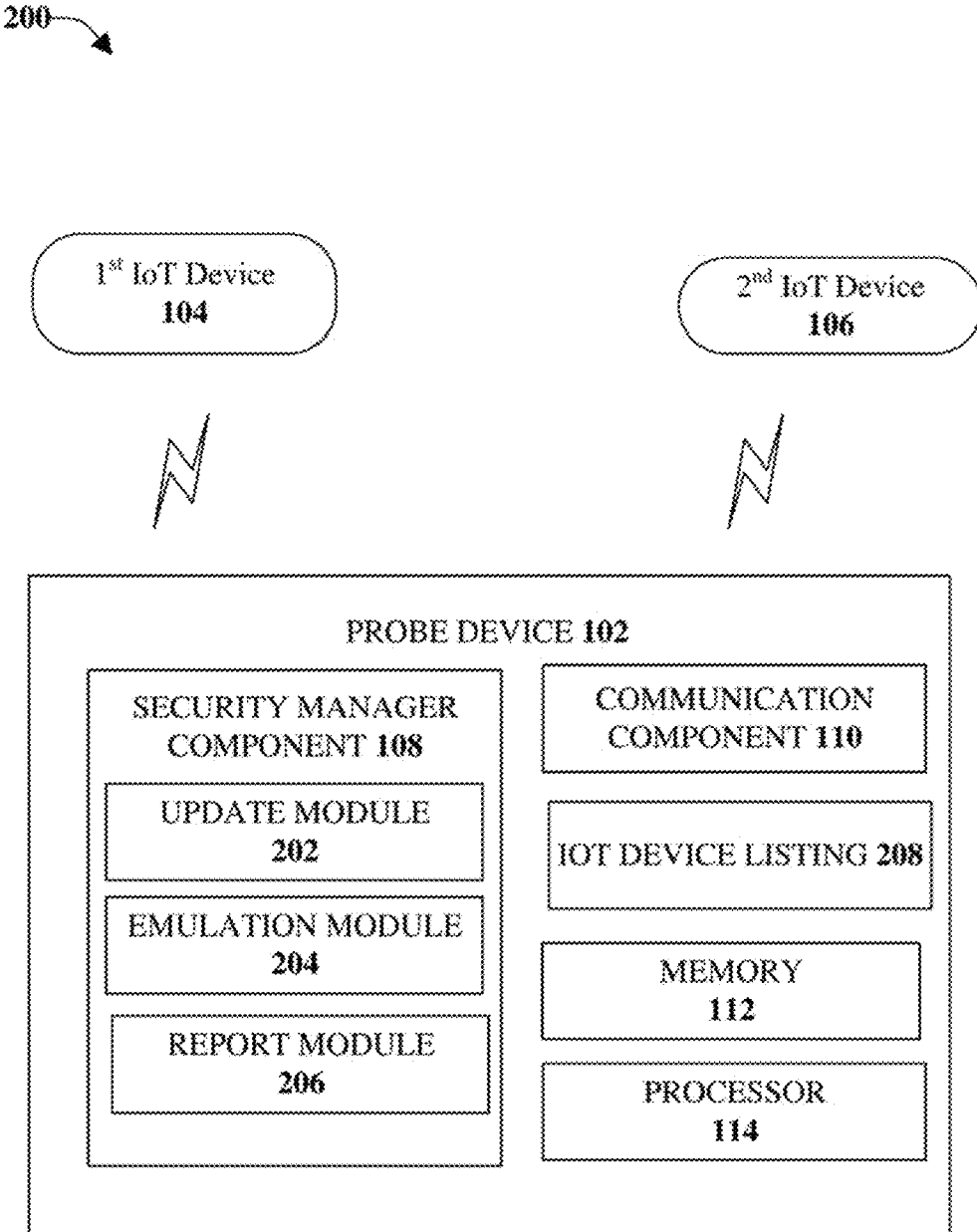
FIG. 2 illustrates an example, non-limiting system for management and configuration of internet of things network connected devices in accordance with one or more embodiments described herein.

FIG. 2 illustrates an example, non-limiting, system 200 for management and configuration of internet of things network connected devices in accordance with one or more embodiments described herein. Repetitive description of like elements employed in other embodiments described herein is omitted for sake of brevity.

The probe device 102 can comprise an update module 202, an emulation module 204, and a report module 206. The probe device 102 can operate in both an active mode and a dormant mode. For example, the probe device 102 can listen to what is occurring in the network and, if a problem is detected, the probe device 102 can observe the network traffic and determine where the problem exists. For example, if there is a spike in throughput on a particular gateway, the probe device 102 can take action, almost immediately, and attempt to communicate with the upstream firewall (e.g., via the communication component 110) to instruct the upstream firewall to block the device because it appears to be compromised.

The update module 202 can implement nearly instantaneous updates of security patches. For example, the security manager component 108 can determine a first identity and a first operational parameter of the first IoT device 104. The security manager component 108 can also determine a second identity and a second operational parameter of the second IoT device 106. The information related to the identity and operational parameters of the IoT devices can be maintained in an IoT device listing 208, which can be a database, for example. The operational parameters can include, for example, a security configuration of the IoT device, a latest security version installed on an IoT device, historical information related to the IoT devices and/or the network, and so on. Such historical information can include previously detected security vulnerabilities, usage patterns, network traffic patterns, and so on.

To update the security patches, the update module 202 can determine where the recent vulnerabilities exist in terms of port security and exploits. For example, the update module 202 can probe the network of proximal devices (e.g., proximal probing). In contrast to traditional firewalls, the security manager component 108 can use various communication protocols, including, but not limited to, Wi-Fi, BlueTooth, Zigbee, Z-Wave, and so on.

The emulation module 204 can operate as a honeypot and can isolate one or more IoT devices from security vulnerabilities by mimicking or operating as if the emulation module 204 was the protected IoT device. For example, the emulation module 204 can detect that a computer worm, which is a standalone malware computer program that replicates itself in order to spread, is attempting to send changes for heat settings through a IoT heating element. In this case, the emulation module 204 can protect the IoT heating element by setting up fake heating settings, heat level, or other parameters or functionality of the IoT heating element. Thus, the computer worm might attempt to access the IoT heating element, but is instead communicating with the probe device 102. Thus, the emulation module 204 can bait and trap the computer worm. In some implementations, the emulation module 204 can identify the worm or another attached vector.

Thus, the emulation module 204 can place the IoT devices in a quarantine state, as needed, such that the virus or malware has no ability to damage the IoT device or disrupt the network. For example, the emulation module 204 can act as if it is a regular node so everything the malware or virus is doing can be observed in a safe space. For example, the emulation module 204 can evaluate what the malware is doing, how it attacks, where it is coming from, and so on. Based on this gathered information, a solution can be applied.

According to some implementations, the emulation module 204 can perform the security vulnerability analysis proactively. For example, instead of waiting for an IoT device to exhibit a security vulnerability, the emulation module 204 can operate as if it about to be compromised and evaluate reactions to the simulated vulnerability.

Since the probe device 102 does not need to be centrally managed, the report module 206 can report whenever security events are discovered. For example, the report module 206 can indicate that everything is okay or that certain security vulnerabilities have been encountered by the emulation module 204 and so on. In some cases, the type of reporting can be user defined (e.g., send an email). In an implementation, a determination can be made as to which type of device is accessing an IoT device. For example, based on the IP address, it can be determined whether the device is a laptop, a television, a lighting element, a vehicle, and so on. Based on this information, the report module 206 can report directly to a vendor, for example, with information as to the compromised state observed on a particular IoT device and can also provide the introspection information obtained.

Figure 3:
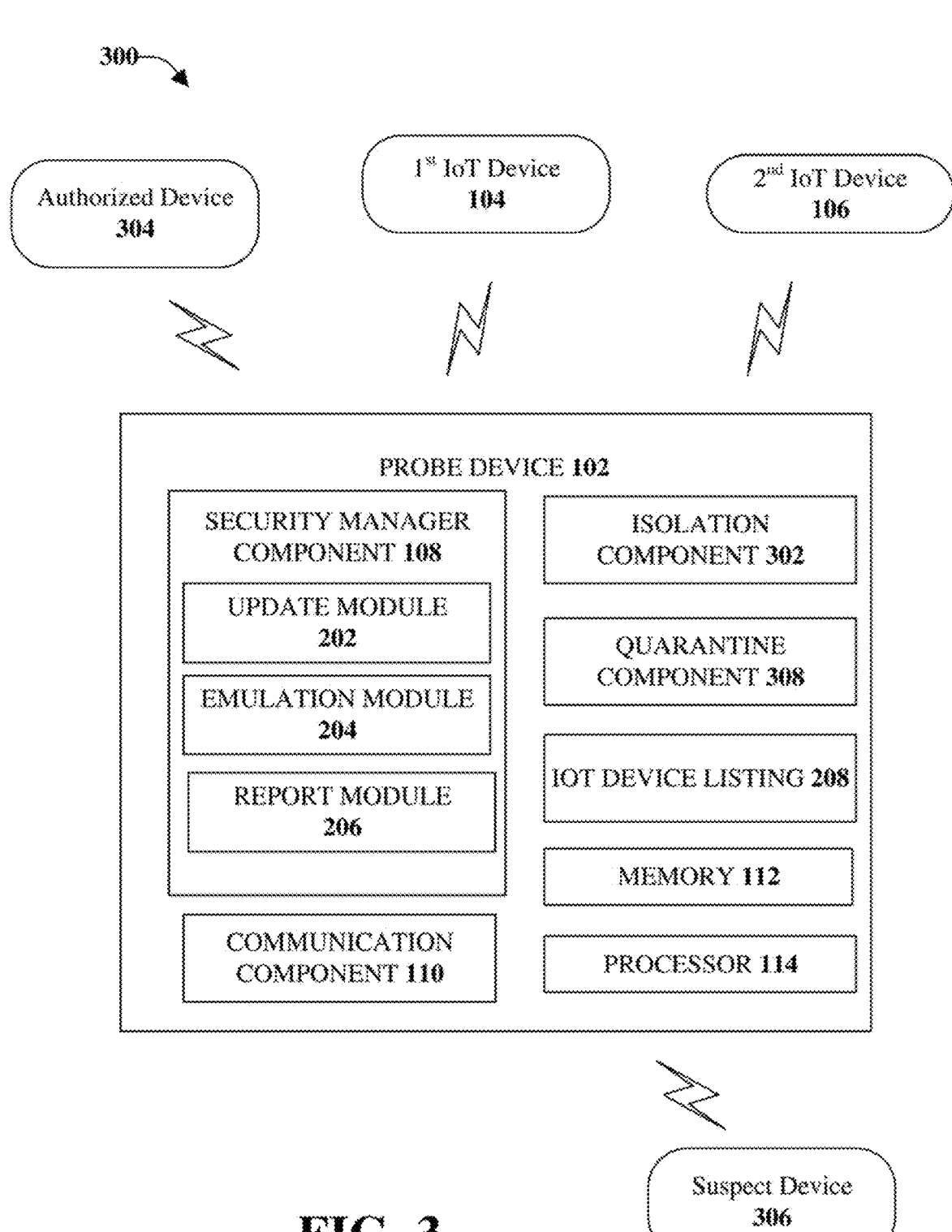
FIG. 3 illustrates an example, non-limiting, communications system for facilitating security features associated with one or more internet of things devices of a local network in accordance with one or more embodiments described herein.

FIG. 3 illustrates an example, non-limiting, communications system 300 for facilitating security features associated with one or more internet of things devices of a local network in accordance with one or more embodiments described herein. Repetitive description of like elements employed in other embodiments described herein is omitted for sake of brevity.

In an example, the probe device 102 can determine respective identities and respective operational parameters of IoT devices (e.g., the first IoT device 104 and the second IoT device 106) in a local network. Information related to the IoT devices can be retained in an IoT device listing 208. Based on the identities and operational parameters, the update module 202 can facilitate respective security updates at the IoT devices based on responsibility for security synchronization being delegated to the probe device 102. For example, a first security update can be facilitated at the first IoT device 104 and a second security update can be facilitated at the second IoT device 106.

In an implementation, the update module 202 can pool security patch versions for the first IoT device 104 and the second IoT device 106. Based on the security patch versions, a first group of security features can be updated at the first IoT device 104 and a second group of security features can be updated at the second IoT device 106.

A determination can be made that a security vulnerability has manifested on the first IoT device 104, for example. Based on this detection, an isolation component 302 can be configured to isolate the first IoT device 104 from the security vulnerability. For example, the isolation component 302 and the emulation module 204 can operate together to simulate operation of the first IoT device 104 with respect to features associated with the security vulnerability. For example, if a security vulnerability exists with an email server, the features associated with the email server can be simulated.

According to some implementations, isolating the first IoT device 104 from the security vulnerability can comprise intercepting malicious instructions associated with malicious actions intended for the first IoT device 104. Intercepting the malicious instructions can comprise routing the malicious instructions associated with the malicious actions to the probe device 102.

Further, the report module 206 can report a state of the communication network to a security network entity or device. The state of the defined communication network can comprise security log filtering based on respective capacity parameters of the first IoT device 104 and the second IoT device 106.

In some implementations, communications outside the local network (e.g., external communications) can be prohibited by the probe device 102. For example, the local network can be utilized in an environment that should be secure (e.g., hospital, government building) and it might be desired to not allow the probe device 102 (and the IoT devices) to talk directly to the internet. Thus, communications between the probe device 102 and external devices located outside the defined communication network can be disabled. To obtain internet access (e.g., to obtain security updates and/or patches), the probe device 102 can piggyback on an authorized device 304 associated with people passing through the network in order to achieve the connectivity.

For example, an establishment of a communication link between the probe device (e.g., the probe device 102) and the authorized device 304 can be facilitated based on a determination that the authorized device 304 is within the defined communication network. The authorized device 304 can be determined (as compared to unauthorized devices) through utilization of an "opt-in" feature. For example, there can be a peer-to-peer relationship where there is companion software installed on the authorized device 304. The companion software can allow the probe device 102 to communicate to and through the authorized device 304. For example, based on the communication link, the authorized device 304 can open a port or connectivity for the probe device 102.

After establishment of the communication link, the probe device 102 can communicate with external devices. Upon or after the authorized device 304 has been removed from the local network, communication between the probe device 102 and the external devices can be discontinued.

In some implementations, a device (illustrated as a suspect device 306) can be brought into the environment that can be actively or passively (e.g., knowingly or unknowingly) bring vulnerable IoT into the network. In another example, the suspect device 306 can be set up in such a way that the device cannot interact with the IoT devices in the network. Therefore, the suspect device 306 could present a security vulnerability to the network. Thus, the security manager component 108 can detect the suspect device 306 within the environment and a quarantine component 308 can place the suspect device 306 in quarantine based on not knowing enough information about the suspect device 306 and/or based on a determination that an agreement has not been established between the suspect device 306 and the communication network. In an example, quarantining the suspect device 306 can include routing network traffic with the suspect device 306 via the probe device 102 (e.g., not directly to the IoT devices).

In some implementations, the environment being protected by the probe device 102 can be taken into consideration. For example, a new device can have unexpected actions (e.g., a new phone connects information when it is taken to work). Through utilization of the probe device 102, this vulnerability can be locally spotted. Similarly, in a neighborhood, as a device is moved around the neighborhood, the device can be inadvertently spreading some malware to open networks.

Figure 4:
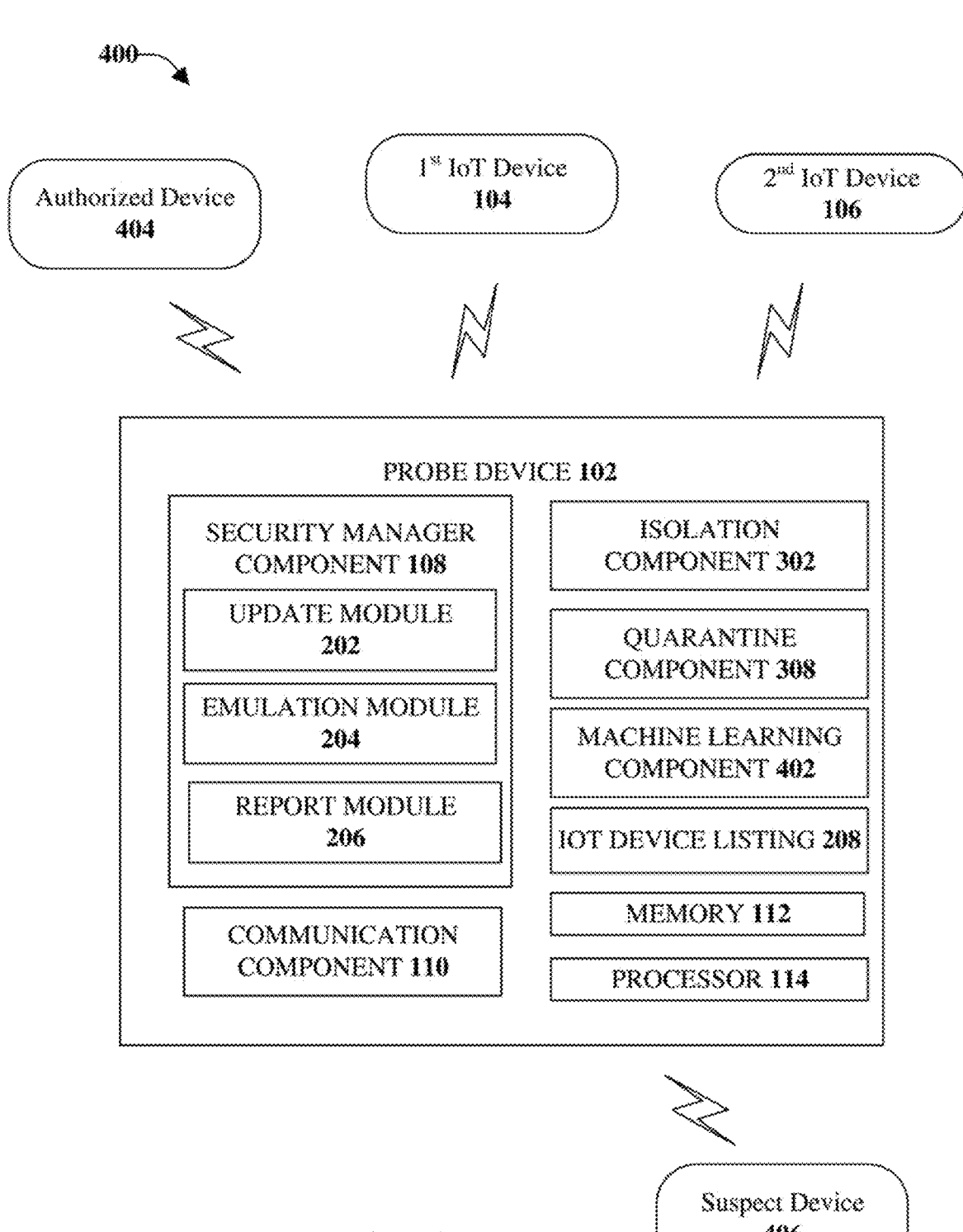
FIG. 4 illustrates an example, non-limiting, system that employs machine learning to automate management and configuration of internet of things network connected devices in accordance with one or more embodiments described herein.

FIG. 4 illustrates an example, non-limiting, system 400 that employs machine learning to automate management and configuration of internet of things network connected devices in accordance with one or more embodiments described herein. Repetitive description of like elements employed in other embodiments described herein is omitted for sake of brevity. The system 400 can comprise one or more of the components and/or functionality of communication network 100, system 200, and/or communications system 300, and vice versa.

The system 400 can include a machine learning and reasoning component 402, which can be utilized to automate one or more of the disclosed aspects. The machine learning and reasoning component 402 can employ automated learning and reasoning procedures (e.g., the use of explicitly and/or implicitly trained statistical classifiers) in connection with performing inference and/or probabilistic determinations and/or statistically-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models constructed using machine learning and/or automated learning procedures. Logic-centric inference can also be employed separately or in conjunction with probabilistic methods.

The machine learning and reasoning component 402 can infer, for one or more connected IoT devices, expected interactions between the IoT devices and a probe device 102 or another device (e.g., server, other IoT devices, and so on). Based on this knowledge, the machine learning and reasoning component 402 can make an inference that a security vulnerability exists with respect to at least one IoT device.

As used herein, the term "inference" refers generally to the process of reasoning about or inferring states of the system, a component, a module, the environment, and/or models from a set of observations as captured through events, reports, data, and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects, for example, in connection with management and configuration of Internet of things network connected devices based on knowledge derived from the IoT devices can employ various artificial intelligence-based schemes for carrying out various aspects thereof. For example, a process for determining if an IoT device is compromised based on historical interactions with the IoT device can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistically-based analysis (e.g., factoring into the analysis utilities and costs) to prognose or infer an action that should be employed to determine how to repair an IoT device that exhibits a security vulnerability. In the case of IoT device security, for example, attributes can be identification of one or more interactions between an IoT device and the probe device 102, and the classes can be historical patterns and deviations from the historical patterns.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording asset (e.g., IoT device) behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining a security vulnerability exists, determining an IoT device has been compromised, and so forth. The criteria can include, but is not limited to, similar interactions of interest, related information, and so forth.

Additionally, or alternatively, an implementation scheme (e.g., a rule, a policy, and so on) can be applied to control and/or regulate management and configuration of IoT devices and resulting actions, inclusion of one or more devices in the local network, exclusion of one or more devices in the local network, and so forth. In some implementations, based upon a predefined criterion, the rules-based implementation can automatically and/or dynamically interpret types of relations among IoT devices. In response thereto, the rule-based implementation can automatically interpret and carry out functions associated with security updates and synchronization by employing a predefined and/or programmed rule(s) based upon any desired criteria.

Figure 5:
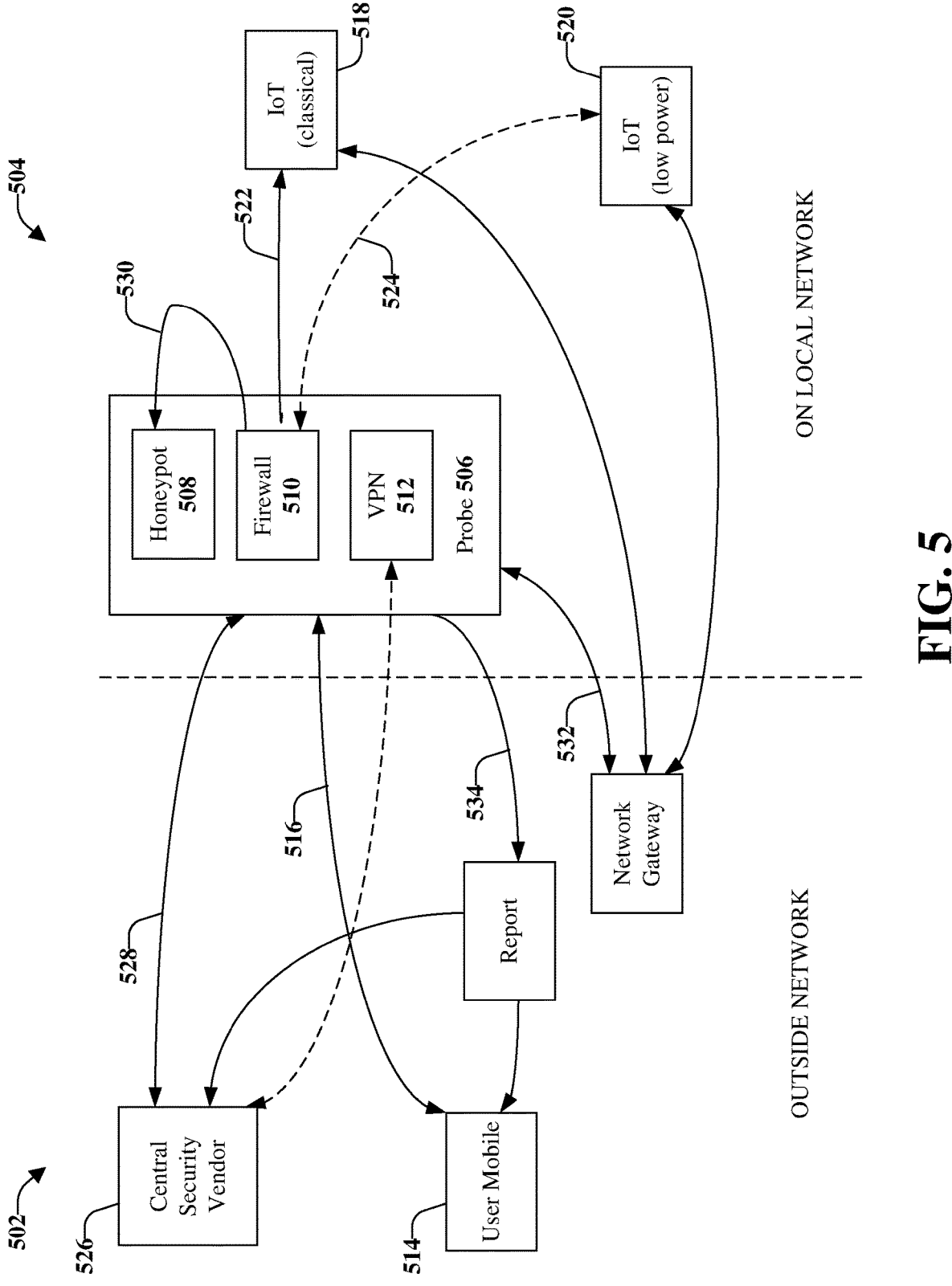
FIG. 5 illustrates an example, non-limiting use case of utilizing a low-drop-in probe device to secure and update a home network in accordance with one or more embodiments described herein.

FIG. 5 illustrates an example, non-limiting use case of utilizing a low-drop-in probe device to secure and update a home network in accordance with one or more embodiments described herein. As discussed herein, the probe device (e.g., the probe device 102) can be a low-effort device that can be "dropped-into" a network. FIG. 5 illustrates the various aspects from the perspective of a user of the probe device, such as a consumer. The left side of FIG. 5 illustrates outside a local network 502 and the right side of FIG. 5 illustrates on the local network 504.

In an example, a probe 506 (e.g., the probe device 102) can be obtained and configured with a cell phone or another device for a local network (e.g., the local network 504). In some cases, the probe can be purchased for use in a home, however, the disclosed aspects are not limited to this implementation.

As illustrated the probe 506 can include one or more functionalities including, but not limited, functionality as a honeypot 508, a firewall 510, and a virtual private network or VPN 512. Further, the probe 506 can be implemented as a hardware device (e.g., a USB drive or another type of device). However, in some implementations, the probe 506 can be a software implementation.

In an example, the probe 506 can be configured with a mobile device 514 (e.g., a phone or other user device), as indicated by line 516. After being configured for use on the network (e.g., provisioned), the probe 506 can periodically inspect one or more IoT devices on the local network 504. The probe 506 can inspect the IoT device by polling, watching traffic, observing conditions, and so on. For example, some IoT devices 518 can be what are considered classical IoT devices (e.g., cell phone, laptop, and so on). Other IoT devices can be low-power IoT devices 520. For example, the low-power IoT devices 520 can include devices utilized to facilitate a "smart-home" and can include, but are not limited to, lighting devices, heating and cooling devices, structure security devices, appliances, and so on. The probe 506 can periodically inspect the IoT devices 518, as indicated by line 522.

According to some implementations, the probe 506 can utilize low-power protocols for sleeping devices. Further, the probe 506 can monitor future low-power IoT chirps (e.g., or other forms of communication received from the IoT devices) to add recently installed devices to a list of known set of devices on the network.

Optionally, for low-power mesh networking, indicated by line 524, the probe 506 can insert itself as a firewall/router (e.g., the firewall 510). According to some implementations, the probe 506 can passively convey data, but can begin promiscuous mode to inspect all traffic. For example, in a smart home, a device (e.g. a versatile digital assistant) can be in communication with a low power device. The probe 506 can negotiate with the versatile digital assistant to be a man-in-the-middle and perform a relay or an inspection of the network traffic.

Over time, the probe 506 can receive security or software updates for a known device from a central server 526, as indicated by line 528. Additionally, the probe 506 can intersect updates when known IoT is present on the network, at line 522. For example, the probe 506 can communicate with IoT for updates (see line 516). Optionally, the probe 506 can opportunistically connect to a user phone to stage an update.

As indicated by dashed line 530, the probe 506 can update itself to emulate honeypot of unpatched device exploit and can rescan devices. For example, the probe 506 can intercept malicious action via the honeypot. In some implementations, the probe 506 can increase probe frequency. For example, an IoT device can become infected and can be identified by the probe 506. The probe 506 can contain the interactions between the infected device and other devices. The infected device can continue to operate; however, its actions can be reported. Further, the probe 506 can attempt to heal the device (e.g., remove the infection) without totally shutting down the infected device.

In another aspect, the probe 506 can alter administrative contacts. In an example, if the probe 506 detects a compromised device, the probe can attempt to VPN traffic (e.g., quarantine) for that device to a trusted external source. The quarantine can be utilized to prevent other proximal devices from being impacted.

In an optional implementation, the probe 506 can monitor general throughput and actions of IoT devices. For example, anomalies could be detected as warnings and reported similarly. There can be general network operations that can be performed to monitor bandwidth usage or behaviors of a device. For example, if the device goes from checking the webserver once a month or week to five times a minute, there is something that should be observed there. With a feature indicator, intelligence can be added with machine learning to build a model that this is the particular characteristic of the IoT device. The probe can indicate it has seen these things historically and can observe changes in that behavior to detect a problem.

In another example, intelligent security through behavior analysis can be provided. By monitoring what actions are initiated on the system, a profile of trusted users (e.g., a trusted instruction set) can be built. Further, as discussed herein, machine learning models to verify the versions of IoT updates and can be maintained within expectation.

At 534, a report can be generated. In some embodiments, the data included in the report can be anonymized. The report can be distributed to responsible parties. In an example, stateful learning of interactions of a probe with an IoT device can be uploaded to the central security vendor, for example.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited to the number or order of blocks, as some blocks can occur in different orders and/or at substantially the same time with other blocks from what is depicted and described herein.

Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, a machine-readable storage medium, comprising executable instructions that, when executed by a processor, facilitate performance of the methods. According to other implementations, a non-transitory computer-readable medium, comprising executable instructions that, when executed by a processor, facilitate performance of the methods.

Figure 6:
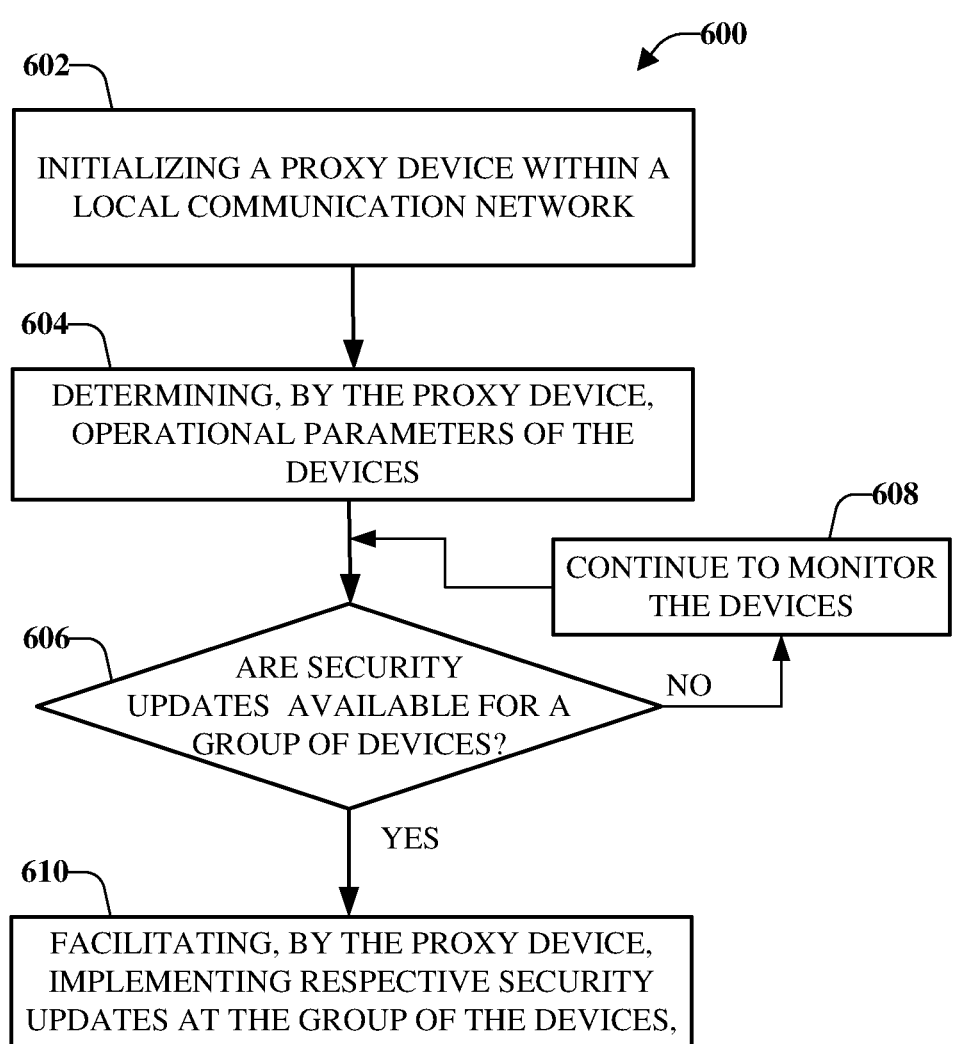
FIG. 6 illustrates an example, non-limiting, method for facilitating management and configuration of internet of things network connected devices in accordance with one or more embodiments described herein.

FIG. 6 illustrates an example, non-limiting, method 600 for facilitating management and configuration of internet of things network connected devices in accordance with one or more embodiments described herein. The method 600 can be implemented by a probe device that can comprise a processor and a memory. In some implementations, the probe device can be a network device of a wireless network. In other implementations, the probe device can be a software instance of the probe device, which can be installed on another device. Alternatively, or additionally, a machine-readable storage medium can comprise executable instruction that, when executed by a processor of the probe device, facilitate performance of operations for the method 600.

The method 600 starts at 602 when a probe device is initialized within a local communication network. Initializing the probe device can comprise physically installing the probe device in the communication network (e.g., as a physical device). In another example, initializing the probe device can comprise installing software associated with the probe device on one or more other devices within the communication network.

Further, the probe device can provide security update synchronization for devices of the local communication network. According to an example, the devices can be classified as internet of things (IoT) network connected devices. The IoT devices can be various types of devices, including mobile phones, computers, cameras, appliances, lighting fixtures, printers, security systems, heating systems, cooling systems, and so on.

The method 600 continues, at 604, with determining, by the probe device, operational parameters of the devices. The operational parameters can comprise a security parameter. For example, the security parameter can include details related to the security features installed on the devices such as a version number, a revision number, security support information, and so on. In another example, the operational parameters can include respective identifications of the devices (e.g., device type, device identification, manufacturer, functionalities, data installed, last software update date, and so on).

A determination can be made by the probe device, at 606, whether security updates are available for a group of the devices based on the operational parameters. If security updates are not available ("NO"), at 608, the probe device continues to monitor the devices for security related issues as discussed herein.

If there is a security update available ("YES"), at 610, the probe device can facilitate implementation of respective security updates at the group of the devices. For example, one or more devices could be the same or a similar device and can have a first security update available, while other devices, which are different devices can have a second security update available. In an implementation, the respective security updates can be implemented without interaction from the group of the devices.

FIG. 7 illustrates an example, non-limiting, method 700 for modeling and reporting parameters associated with internet of things network connected devices in accordance with one or more embodiments described herein. The method 700 can be implemented by a probe device.

At 702, the probe device can model interactions between the probe device and the devices. The modeling can facilitate anomaly detection related to security functionality for the devices. For example, the modeling can be utilized to determine what is considered to be standard, or normal, for the device. The modeling can be based on historical data gathered over hours, days, weeks, months, years, and so on. In some implementations, the modeling can be utilized to determine a security vulnerability at the device.

The modeled interactions can be reported to a security entity, at 704. For example, the report can be sent to a device associated with a security service provider. The report can include, for example, an identification of a source of the security anomaly and details of the security vulnerability.

In some implementations, the method 700 can include, at 706, facilitating a security update, by the probe device at the one or more devices. For example, the probe device can facilitate a first security update at the first device and a second security update at the second device. According to some implementations, the probe device can have been granted security responsibility for the first device and the second device (e.g., the probe device is a confirmed trusted device).

Figure 8:
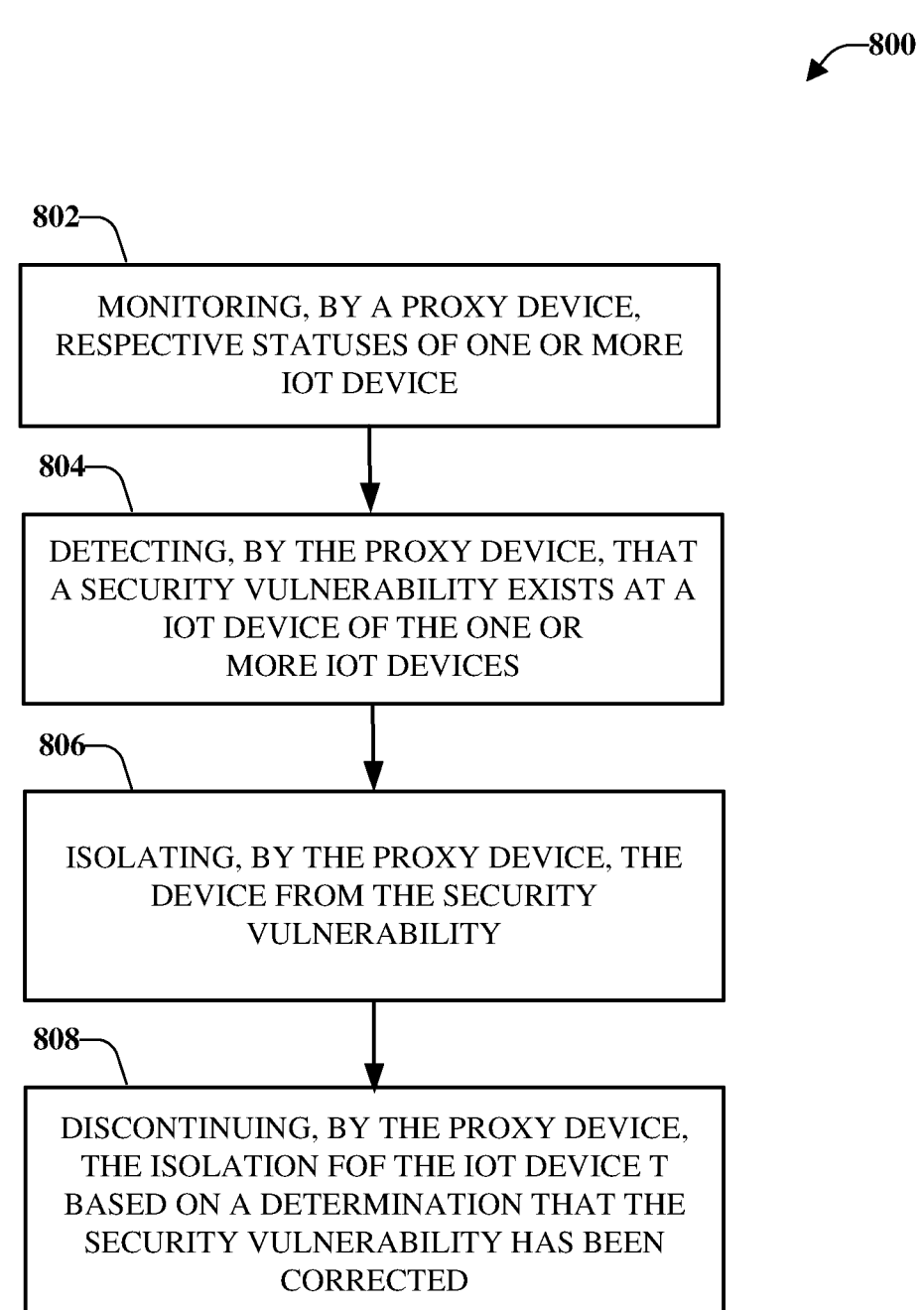
FIG. 8 illustrates an example, non-limiting, method for protecting one or more internet of things network connected devices in accordance with one or more embodiments described herein.

FIG. 8 illustrates an example, non-limiting, method 800 for protecting one or more internet of things network connected devices in accordance with one or more embodiments described herein. The method 800 can be implemented by a probe device that can comprise a memory and a processor.

Respective statuses of one or more IoT devices can be monitored, at 802. The monitoring can include a current operation mode of the device, a current location, and so on. At 804, a security vulnerability at a IoT device of the one or more IoT devices can be detected by the probe device. In some implementations, the security vulnerability can be determined based on learned interactions of the device.

Based on the detected security vulnerability, at 806, the probe device can isolate the IoT device from the security vulnerability. According to an implementation, isolating the device can comprise mimicking, by the probe device, an operation of the device for functionalities associated with the security vulnerability. In an additional or alternative implementation, isolating the device can comprise intercepting network traffic associated with malicious actions intended for the device. Further to this implementation, the network traffic associated with the malicious actions can be routed to the probe device At 808, the probe device can discontinue the isolation of the IoT device. For example, the IoT device can return to normal functionality based on a determination that the security vulnerability has been corrected. According to some implementations, the security vulnerability can be a new device that has entered the communication network.

As discussed herein, the probe device could cache updated for other firmware on IoT devices, which can minimize bandwidth and connectivity. In some implementations, the drop-in device (e.g., the probe device) can opportunistically use passing phones or other devices to push updates to an IoT indirectly. For example, the probe device knows an update is available, but cannot connect, person with the device passes other IoT device, and the probe pushes the update through the device to the IoT device.

In an example, the drop-in probe device can be implemented as a software device (instead of requiring a separate physical device) that can run as a VNF on an existing piece of hardware (e.g., gateway, firewall, and so on).

The drop-in probe device could run multiple virtual environments in honeypot mode to further investigate and contain malicious activity for reporting. In another example, in situations of low connectivity, the probe device could decide what parts of collected data to retain and report on in future sessions based on priority, bandwidth, uniqueness, and so on.

As discussed herein, the (tiny) footprint of the probe device is small, which can be ideal for insertion in busy areas (e.g., need network for each room and there are many rooms in a business), limited resource areas (e.g., understaffed human administrators) or secure areas (e.g., white-room or infrequent access to the area), while still being capable of long-term security updates and activity monitoring.

An updateable running state can allow for machine learning-based anomaly detection. The anomaly detection can be for both firewall and IoT health and version status monitoring.

Further, the advanced honeypot (e.g., attractor for all problematic systems) impersonation for different malicious algorithms, known security exploits, and so on, can be deployed by novices on subnetworks without danger on a real device and with little administrative requirements. In detected compromises, a VPN can shunt away harmful traffic from an exploited device.

The probe can connect to a central oracle for dynamic updates from security organizations for latest firmware updates, requirements, and known exploits automatically with no administration. The probe can send learned interactions with IoT devices to a central server for future prediction and confirmation of device interaction.

Connectivity to low-power devices (e.g., Bluetooth, zigbee, and so on) can be provided by probing/inspecting and pushing correct version updates. Otherwise the low-power devices can miss updates or casual inspection because of low power sleeping modes.

Further, provided is reporting based on inspected software version, verified exploit coverage, last known connection to device, and so on, which can be automatically summarized and reported. For example, the report can be sent to a user, a service provider, a manufacturer, and so on in a uniform fashion.

As used herein, the term network device (e.g., network node, network node device) is used herein to refer to any type of network node serving communications devices and/ or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Described herein are systems, methods, articles of manufacture, and other embodiments or implementations that can facilitate management and configuration of internet of things network connected devices in a communications network. Facilitating management and configuration of IoT devices can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., inter-changeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in Third Generation Partnership Project (3GPP) systems, Fourth Generation (4G) standard for wireless communications, and/or Long Term Evolution (LTE) systems. For example, aspects or features of the disclosed embodiments can be exploited in substantially any wireless communication technology. Such wireless communication technologies can include, but are not limited to, Satellite, Low Power Wide Area (LPWA), UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. As used herein, "5G" can also be referred to as New Radio (NR) access.

Figure 9:
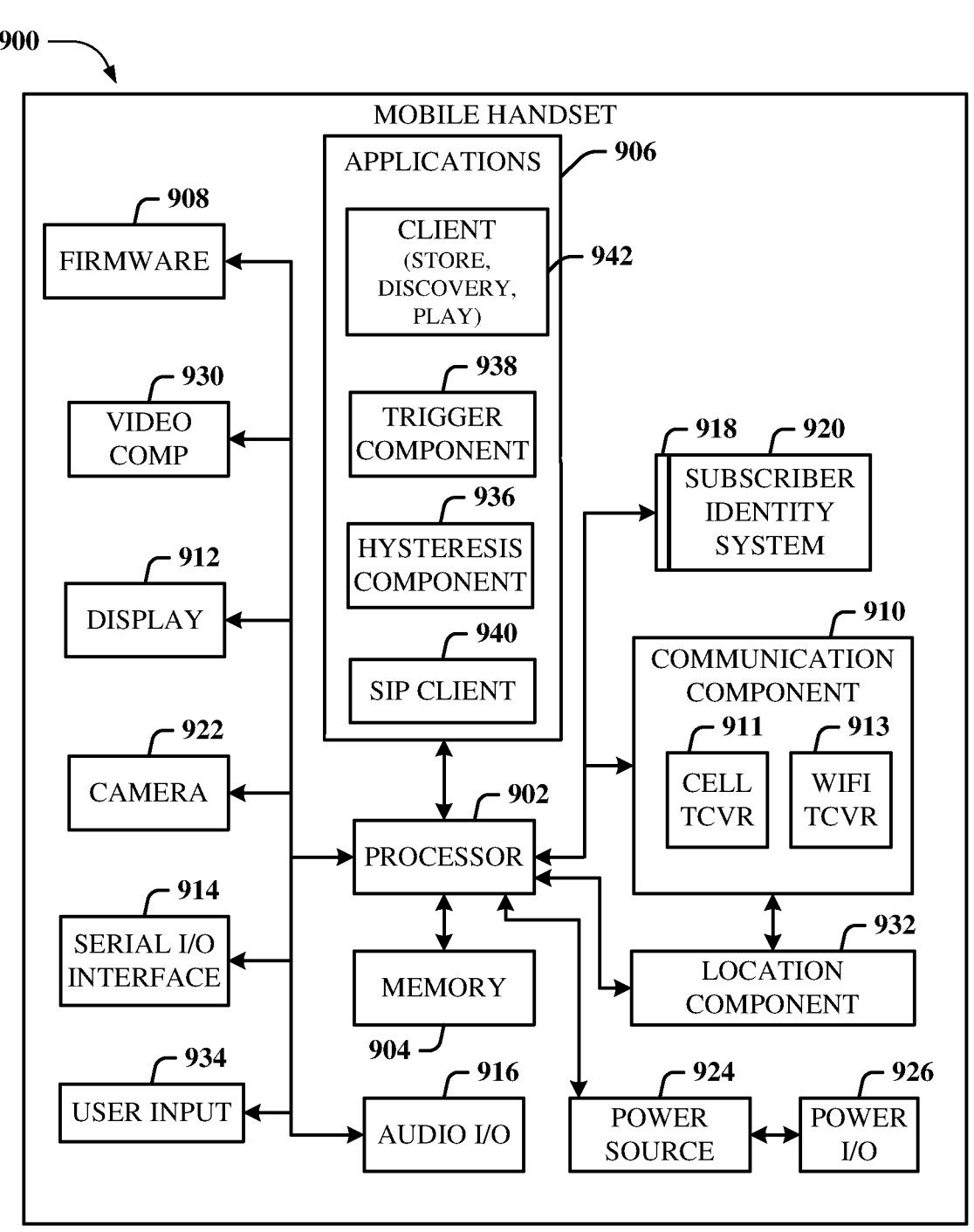
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications

906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
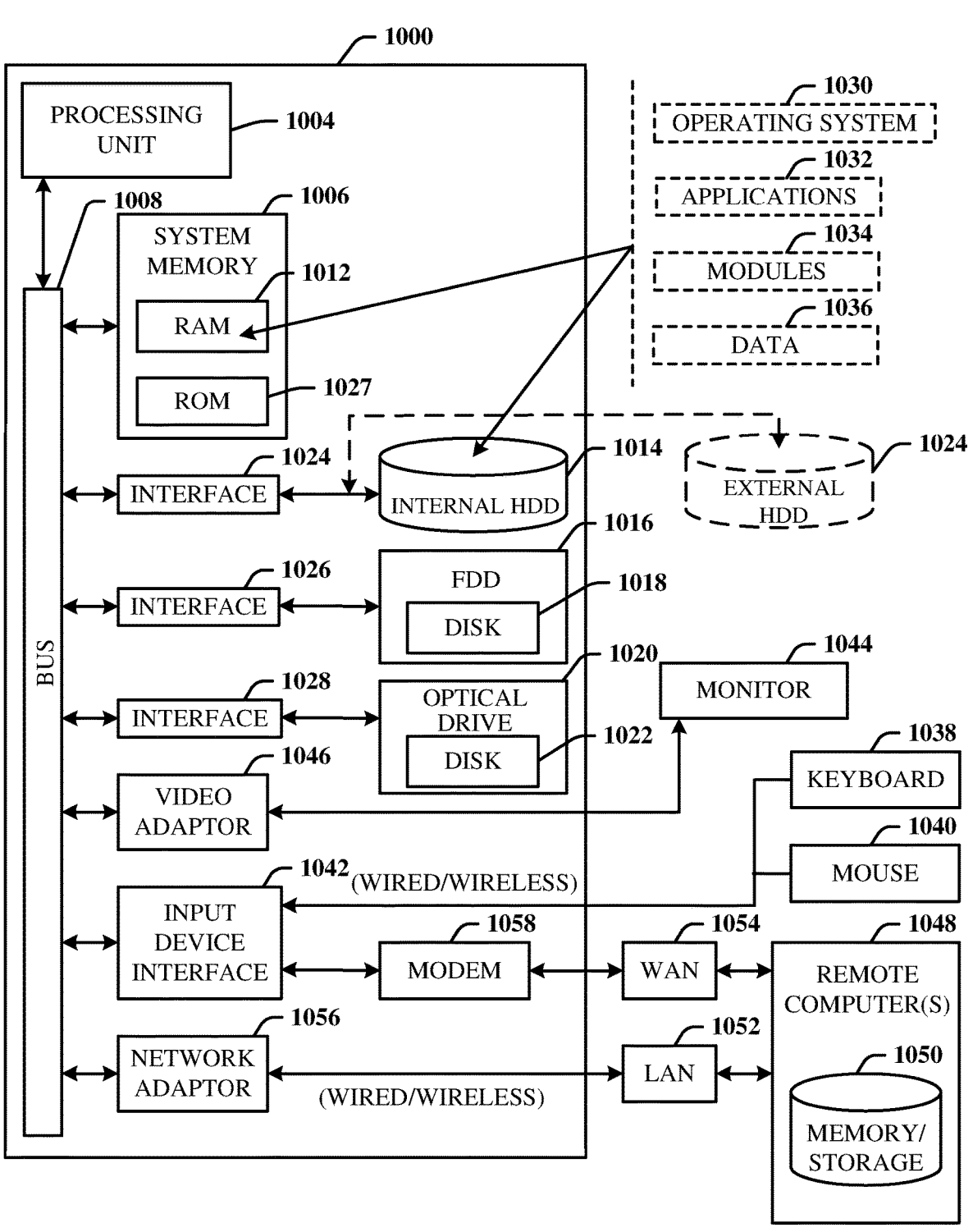
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the various embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a probe device comprising a processor, that an authorized mobile device is temporarily within a communication range of the probe device, wherein the probe device is deployed in a local area network as a gateway device; and based on the authorized mobile device being determined to be temporarily within the communication range, facilitating, by the probe device, an implementation of a security update to an identified device through the authorized mobile device and the probe device with the probe device operating as an intermediary between the authorized mobile device and the identified device to provide a non-direct link between the authorized mobile device and the identified device, wherein the probe device and the identified device are not capable of connecting to an external network, wherein the authorized mobile device provides a connection with the external network to the identified device via the probe device, wherein the probe device is distinct from the authorized mobile device and the identified device, and wherein the authorized mobile device is distinct from the identified device.

2. The method of claim 1, wherein the facilitating of the implementation of the security update comprises establishing, by the probe device, the connection with the external network via the authorized mobile device.

3. The method of claim 1, wherein the facilitating of the implementation of the security update comprises:

conveying information indicative of the security update and an instruction for the authorized mobile device to convey the security update to the probe device; and based on a receipt of the security update from the authorized mobile device, sending the security update to the identified device.

4. The method of claim 1, further comprising:

determining, by the probe device, that a security vulnerability has manifested at the identified device; and in response to the determining that the security vulnerability has manifested, isolating, by the probe device, the identified device from the security update, wherein the isolating comprises simulating an operation of the identified device with respect to at least one feature associated with the security vulnerability.

5. The method of claim 1, wherein the facilitating of the implementation of the security update comprises facilitating the implementation of the security update at the identified device without obtaining location information and connectivity parameters of the identified device.

6. The method of claim 1, further comprising:

based on a determination that the authorized mobile device is no longer within the communication range of the probe device, facilitating, by the probe device, a disconnection of the non-direct link.

7. The method of claim 1, wherein the identified device is in an inactive mode in which operations of the identified device are inhibited.

8. The method of claim 1, wherein the identified device is classified as an internet of things connected device.

9. Probe equipment, comprising:

a processor; and a memory that stores executable instructions that, when executed by the processor, facilitate performance of operations, the operations comprising:

determining that an authorized transient equipment is temporarily within a communication range of the probe equipment, wherein the probe equipment is deployed in a local area network as a gateway device; and based on the authorized transient equipment being determined to be temporarily within the communication range, implementing a security update to a low-power device through the authorized transient equipment and the probe equipment with the probe equipment operating as an intermediary between the authorized transient equipment and the low-power device to provide an indirect link between the authorized transient equipment and the low-power device, wherein the probe equipment and the low-power device are not capable of connecting to an external network, wherein the authorized transient equipment provides a connection with the external network to the low-power device via the probe equipment, wherein the probe equipment is distinct from the authorized transient equipment and the low-power device, and wherein the authorized transient equipment is distinct from the low-power device.

10. The probe equipment of claim 9, wherein the probe equipment is implemented as a component of user equipment that is associated with a defined communication network, and wherein the defined communication network comprises the local area network.

11. The probe equipment of claim 9, wherein the probe equipment is implemented as a stand-alone physical device provisioned on network equipment within a defined communication network, and wherein the defined communication network comprises the local area network.

12. The probe equipment of claim 9, wherein the implementing of the security update comprises establishing the connection with the external network via the authorized transient equipment.

13. The probe equipment of claim 9, wherein the implementing of the security update comprises:

conveying information indicative of the security update and an instruction for the authorized transient equipment to convey the security update to the probe equipment; and based on a receipt of the security update from the authorized transient equipment, sending the security update to the low-power device.

14. The probe equipment of claim 9, wherein the implementing of the security update comprises implementing the security update at the low-power device without obtaining location information and connectivity parameters of the low-power device.

15. The probe equipment of claim 9, wherein the operations further comprise:

based on a determination that the authorized transient equipment is moving away from the communication range of the probe equipment, causing a disconnection of the indirect link.

16. A non-transitory machine-readable medium, comprising executable instructions that, when executed by a processor of network equipment, facilitate performance of operations comprising:

determining that an authorized movable device is temporarily within a communication range of the network equipment, wherein the network equipment is deployed in a local area network as a gateway device; and based on the authorized movable device being temporarily within the communication range, causing the network equipment to operate as an intermediary between the authorized movable device and a device that relies on the network equipment for a security upgrade to provide an establishment of a non-direct link between the authorized movable device and the device for implementing the security upgrade to the device through the authorized movable device and the network equipment with the network equipment operating as the intermediary, wherein the network equipment and the device are not capable of connecting to an external network, wherein the authorized movable device provides a connection with the external network to the device via the network equipment, wherein the network equipment is distinct from the authorized movable device and the device, and wherein the authorized movable device is distinct from the device.

17. The non-transitory machine-readable medium of claim 16, wherein the establishment of the non-direct link comprises establishing the connection with the external network via the authorized movable device.

18. The non-transitory machine-readable medium of claim 16, wherein the establishment of the non-direct link is performed without providing, to the authorized movable device, location information and connectivity parameters of the device that relies on the network equipment for the security upgrade.

19. The non-transitory machine-readable medium of claim 16, wherein the implementing the security upgrade comprises:

conveying information indicative of the security upgrade and an instruction for the authorized movable device to convey the security upgrade to the network equipment; and based on a receipt of the security upgrade from the authorized movable device, sending the security upgrade to the device.

20. The non-transitory machine-readable medium of claim 16, the operations further comprising:

determining that a security vulnerability has manifested at the device; and in response to the determining that the security vulnerability has manifested, isolating the device, wherein the isolating comprises simulating an operation of the device with respect to at least one feature associated with the security vulnerability.

* * * * *